United States Patent
Wang et al.

(10) Patent No.: US 11,856,534 B2
(45) Date of Patent: Dec. 26, 2023

(54) TRANSMITTING SIDELINK REFERENCE SIGNALS FOR JOINT CHANNEL ESTIMATION AND AUTOMATIC GAIN CONTROL

(71) Applicant: QUALCOMM Incorporated, San Diego, CA (US)

(72) Inventors: Xiaojie Wang, Hillsborough, NJ (US); Xiaoxia Zhang, San Diego, CA (US); Jing Sun, San Diego, CA (US); Junyi Li, Fairless Hills, PA (US); Piyush Gupta, Bridgewater, NJ (US); Sony Akkarakaran, Poway, CA (US); Peter Gaal, San Diego, CA (US); Jung Ho Ryu, Fort Lee, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/304,821

(22) Filed: Jun. 25, 2021

(65) Prior Publication Data

US 2022/0417871 A1 Dec. 29, 2022

(51) Int. Cl.
*H04W 52/52* (2009.01)
*H04L 27/26* (2006.01)
*H04J 13/00* (2011.01)
*H04W 92/18* (2009.01)

(52) U.S. Cl.
CPC ......... *H04W 52/52* (2013.01); *H04J 13/0062* (2013.01); *H04L 27/2607* (2013.01); *H04L 27/2615* (2013.01); *H04W 92/18* (2013.01)

(58) Field of Classification Search
CPC . H04W 52/52; H04W 92/18; H04W 72/0446; H04W 4/40; H04J 13/0062; H04L 27/2607; H04L 27/2615; H04L 5/0048; H04L 27/2613; H04L 27/26025; H04L 27/2657; H04L 5/0005
See application file for complete search history.

(56) References Cited

U.S. PATENT DOCUMENTS

| | | | |
|---|---|---|---|
| 11,490,341 B2* | 11/2022 | Li | H04W 4/40 |
| 2017/0251439 A1* | 8/2017 | Liu | H04W 52/52 |
| 2018/0076917 A1* | 3/2018 | Pan | H04B 7/0639 |
| 2018/0167974 A1* | 6/2018 | Li | H04L 5/0048 |
| 2019/0281566 A1* | 9/2019 | Seo | H04J 11/00 |
| 2020/0275458 A1* | 8/2020 | Khoryaev | H04W 92/18 |
| 2020/0288419 A1* | 9/2020 | Gao | H04W 56/0045 |
| 2020/0351975 A1* | 11/2020 | Tseng | H04L 5/0057 |
| 2020/0403689 A1* | 12/2020 | Rofougaran | H04W 52/245 |
| 2021/0007064 A1* | 1/2021 | Yeo | H04W 52/52 |
| 2021/0144731 A1* | 5/2021 | Zhang | H04W 72/121 |
| 2021/0184824 A1* | 6/2021 | Kwak | H04L 5/0098 |
| 2021/0218608 A1* | 7/2021 | Rama Chandran | H04L 27/2678 |
| 2021/0289509 A1* | 9/2021 | Saito | H04L 27/26025 |
| 2022/0077983 A1* | 3/2022 | Ren | H04L 5/0048 |

* cited by examiner

*Primary Examiner* — Oussama Roudani
(74) *Attorney, Agent, or Firm* — Arun Swain

(57) ABSTRACT

Various aspects of the present disclosure generally relate to wireless communication. In some aspects, a receiving user equipment (UE) may receive, from a transmitting UE, a sidelink reference signal in a first symbol of a slot. The receiving UE may perform a joint channel estimation and an automatic gain control (AGC) based at least in part on the sidelink reference signal received in the first symbol of the slot. Numerous other aspects are described.

30 Claims, 10 Drawing Sheets

TRANSMITTING SIDELINK REFERENCE SIGNALS FOR JOINT CHANNEL ESTIMATION AND AUTOMATIC GAIN CONTROL

FIELD OF THE DISCLOSURE

Aspects of the present disclosure generally relate to wireless communication and to techniques and apparatuses for transmitting sidelink reference signals for joint channel estimation and automatic gain control (AGC).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a receiving user equipment (UE) includes a memory and one or more processors, coupled to the memory, configured to: receive, from a transmitting UE, a sidelink reference signal in a first symbol of a slot; and perform a joint channel estimation and an automatic gain control (AGC) based at least in part on the sidelink reference signal received in the first symbol of the slot.

In some implementations, a method of wireless communication performed by a receiving UE includes receiving, from a transmitting UE, a sidelink reference signal in a first symbol of a slot; and performing a joint channel estimation and an AGC based at least in part on the sidelink reference signal received in the first symbol of the slot.

In some implementations, a non-transitory computer-readable medium storing a set of instructions for wireless communication includes one or more instructions that, when executed by one or more processors of a receiving UE, cause the receiving UE to: receive, from a transmitting UE, a sidelink reference signal in a first symbol of a slot; and perform a joint channel estimation and an AGC based at least in part on the sidelink reference signal received in the first symbol of the slot.

In some implementations, a receiving apparatus for wireless communication includes means for receiving, from a transmitting apparatus, a sidelink reference signal in a first symbol of a slot; and means for performing a joint channel estimation and an AGC based at least in part on the sidelink reference signal received in the first symbol of the slot.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
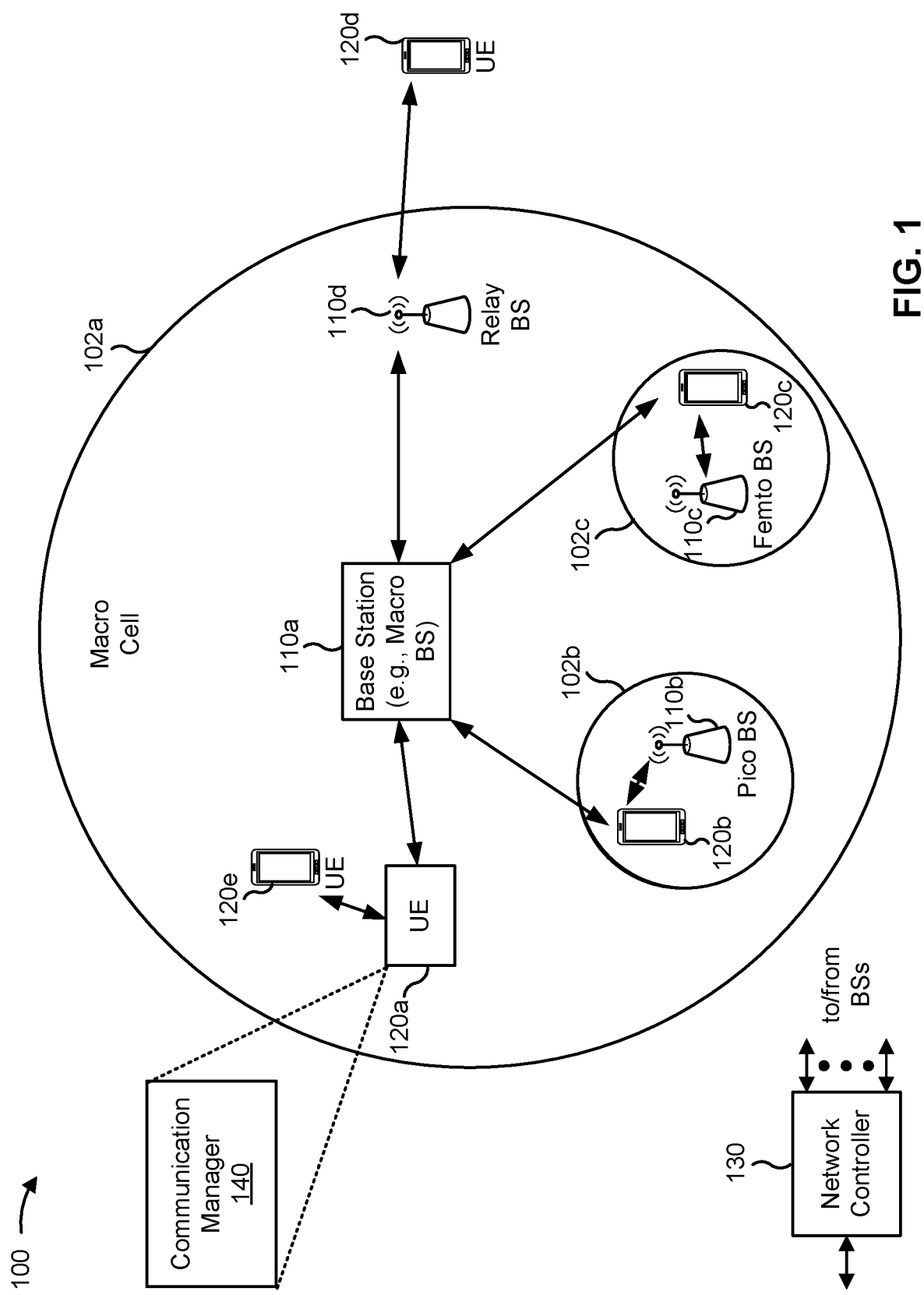
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a receiving UE (e.g., UE 120e) may include a communication manager 140. As described in more detail elsewhere herein, the communication manager 140 may receive, from a transmitting UE (e.g., UE 120a), a sidelink reference signal in a first symbol of a slot, and perform a joint channel estimation and an AGC based at least in pant on the sidelink reference signal received in the first symbol of the slot. Additionally, or alternatively, the communication manager 140 may perform one or more other operations described herein.

As indicated above, FIG. 1 is provided as an example. Other examples may differ from what is described with regard to FIG. 1.

Figure 2:
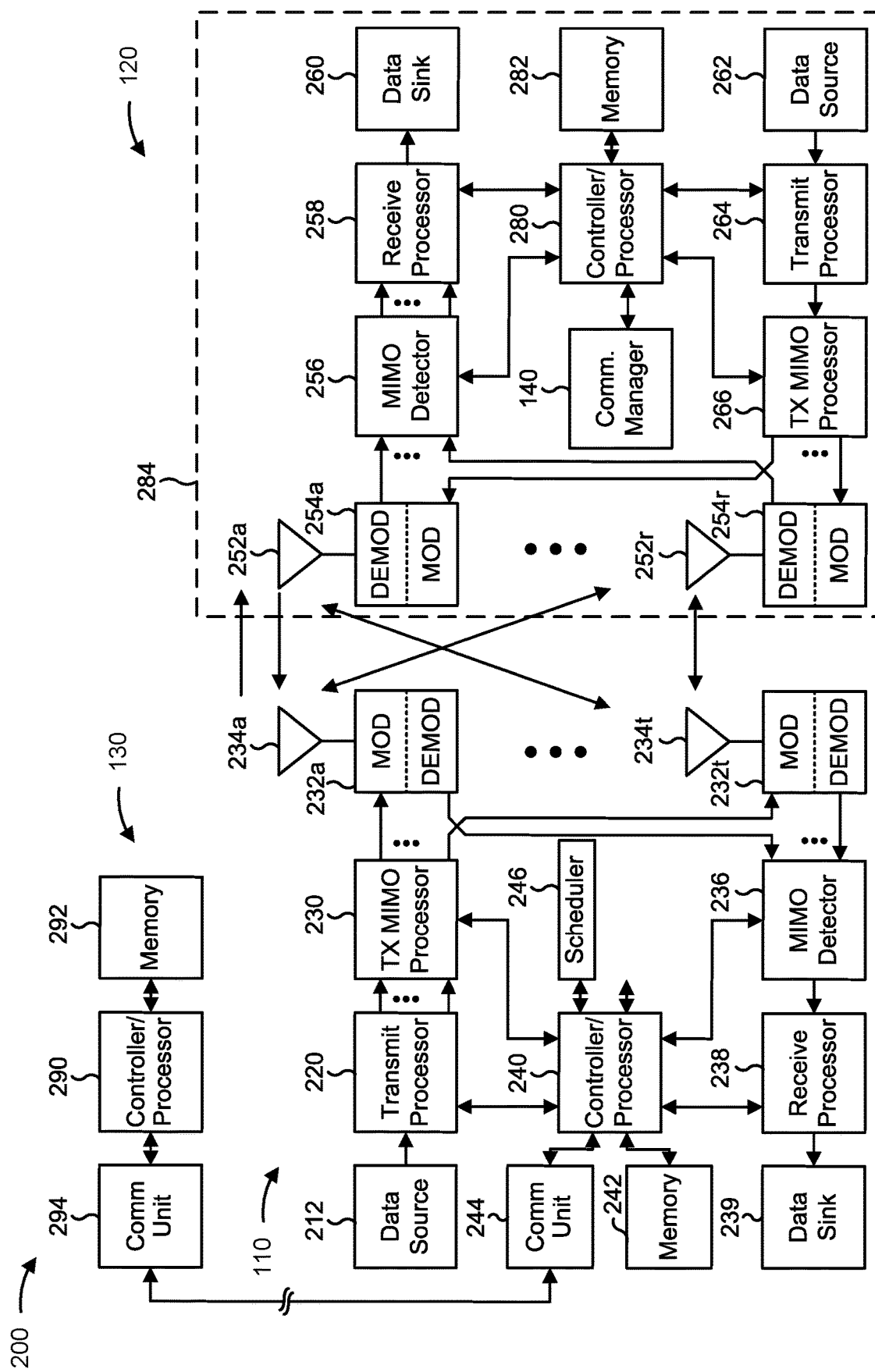
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-9).

The controller/processor 240 of the base station 110, the controller/processor 280 of the UE 120, and/or any other component(s) of FIG. 2 may perform one or more techniques associated with transmitting sidelink reference signals for joint channel estimation and AGC, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, a receiving UE (e.g., UE 120e) includes means for receiving, from a transmitting UE (e.g., UE 120a), a sidelink reference signal in a first symbol of a slot; and/or means for performing a joint channel estimation and an AGC based at least in part on the sidelink reference signal received in the first symbol of the slot. The means for the receiving UE to perform operations described herein may include, for example, one or more of communication manager 140, antenna 252, modem 254. MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above. FIG. 2 is provided as an example. Other examples may differ from what is described with regard to FIG. 2.

Figure 3:
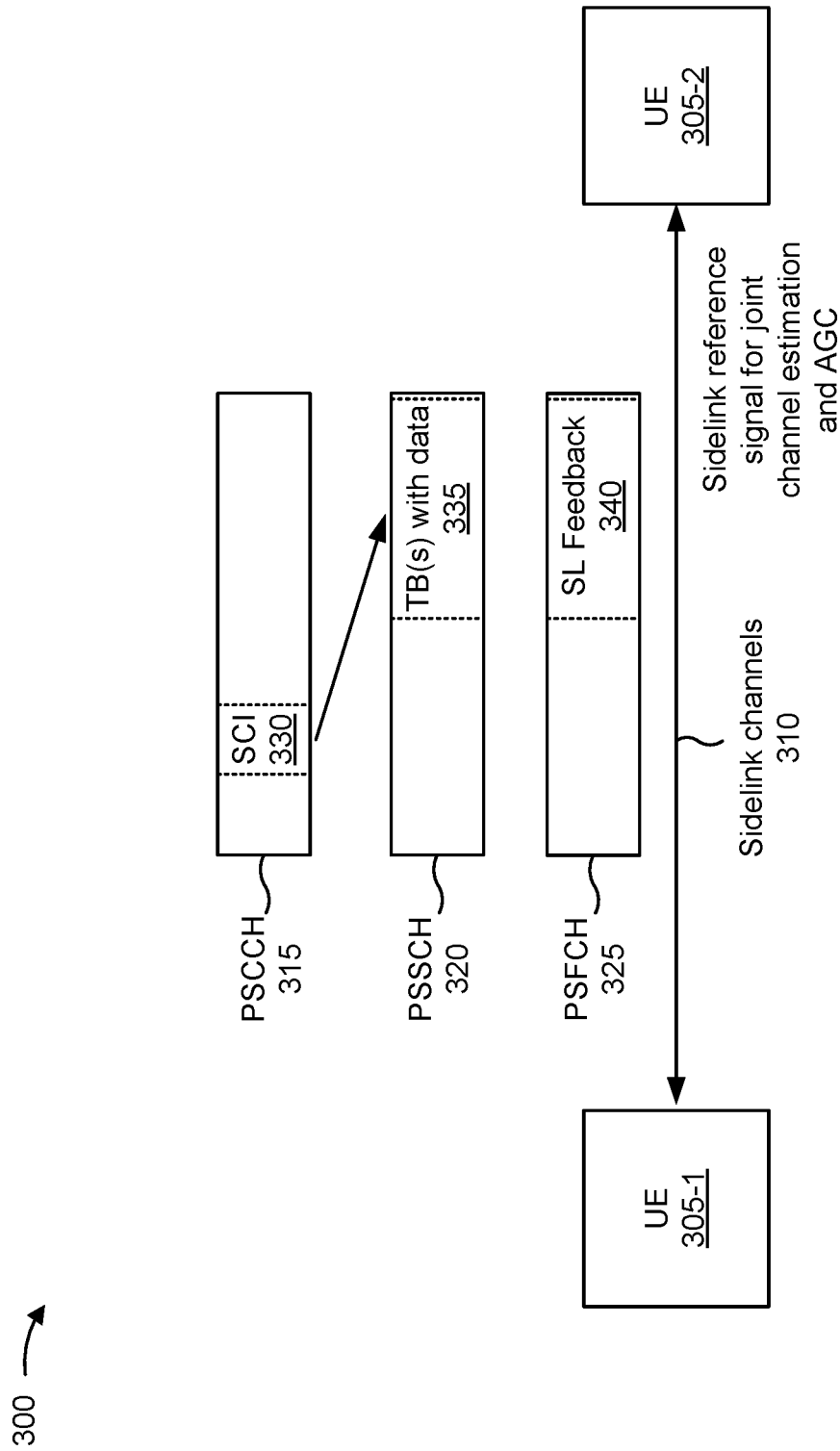
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally. or alternatively, the UEs 305 may synchronize timing of transmission time intervals (TTIs) (e.g., frames, subframes, slots, or symbols) using global navigation satellite system (GNSS) timing.

In some aspects, the first UE 305-1 may transmit, to the second UE 305-2, a sidelink reference signal in a first symbol of a slot. The second UE 305-2 may perform a joint channel estimation and an AGC based at least in part on the sidelink reference signal received in the first symbol of the slot.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in subchannels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
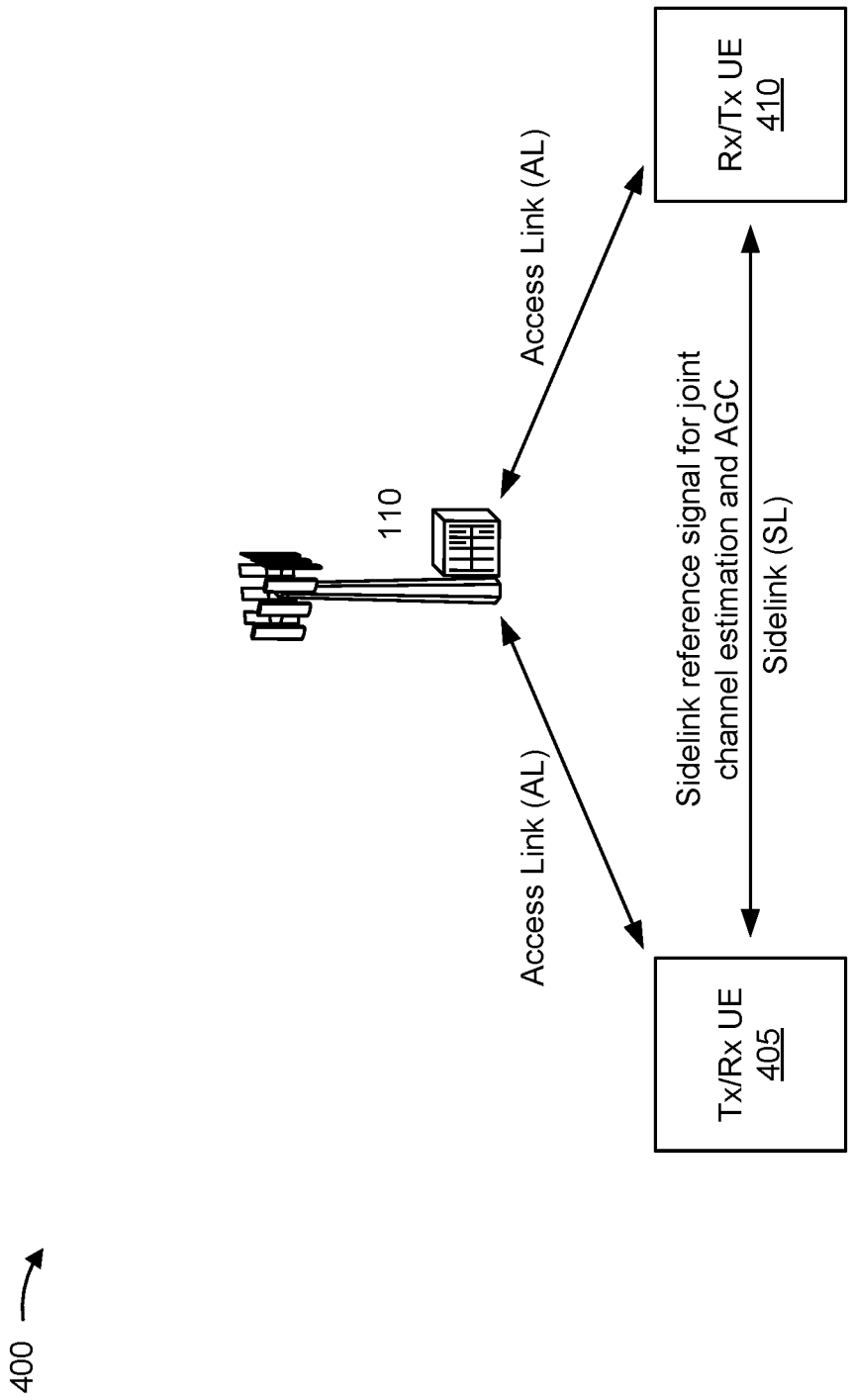
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the Tx/Rx UE 405 may transmit, to the Rx/Tx UE 410, a sidelink reference signal in a first symbol of a slot. The Rx/Tx UE 410 may perform a joint channel estimation and an AGC based at least in part on the sidelink reference signal received in the first symbol of the slot.

As indicated above. FIG. 4 is provided as an example. Other examples may differ from what is described with respect to FIG. 4.

Figure 5:
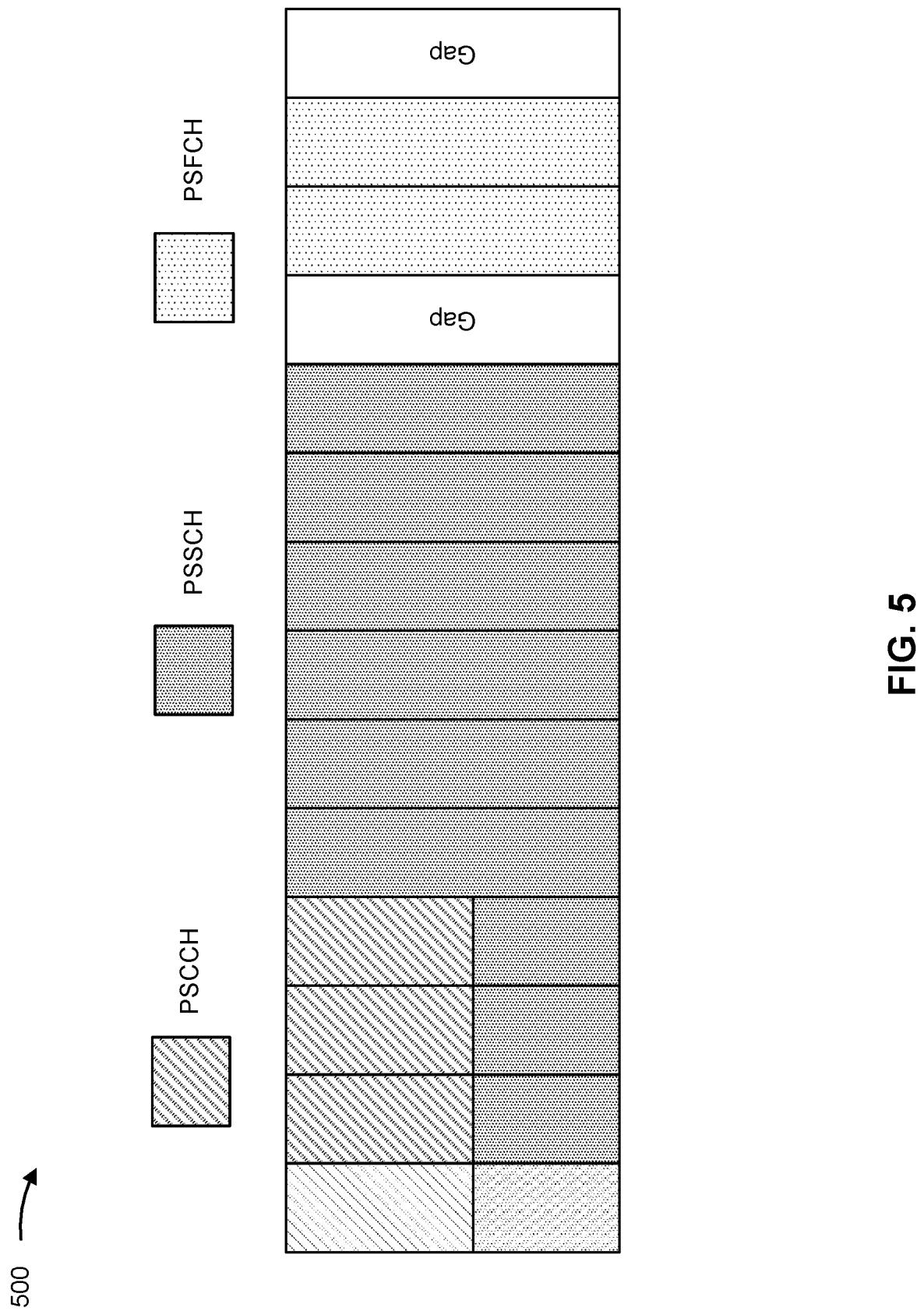
FIG. 5 is a diagram illustrating an example of a slot configured for sidelink communications, in accordance with the present disclosure.

FIG. 5 is a diagram illustrating an example 500 of a slot configured for sidelink communications, in accordance with the present disclosure.

A slot may be configured for sidelink communications, which may include PSCCH transmissions. PSSCH transmissions, and/or PSFCH transmissions. A PSCCH, a PSSCH, and a PSFCH may be transmitted within a same slot. The PSCCH may occupy up to one subchannel with a lowest subchannel index. SCI-1 may be transmitted in the PSCCH and may indicate information regarding a PSSCH bandwidth and resource reservations in upcoming slots. The PSCCH may be configured (or preconfigured) to occupy 10, 12, 15, 20, or 25 physical resource blocks (PRBs), and may be limited to one subchannel, where each sub-channel may occupy 10, 15, 20, 25, 50, 75, or 100 PRBs. A PSCCH duration may be configured (or preconfigured) to two or three symbols. A PSCCH size may be fixed for a resource pool. The PSSCH may occupy up to $N_{subchannel}^{SL}$ contiguous subchannels. SCI-2 may be decoded after decoding the PSCCH. In other words, the PSSCH may occupy at least one subchannel and may contain the SCI-2.

As indicated above, FIG. 5 is provided as an example. Other examples may differ from what is described with respect to FIG. 5.

Channel estimation may be based at least in part on DMRS symbols within a slot. For cell edge UEs, performance of the channel estimation may be degraded due to channel estimation errors. Joint channel estimation (or DMRS bundling) may enhance an accuracy of the channel estimation. Further, joint channel estimation may enhance an uplink channel coverage, such as a physical uplink shared channel (PUSCH) or physical uplink control channel (PUCCH) coverage.

A UE may support joint channel estimation for an uplink channel (e.g., a PUSCH or PUCCH) based at least in part on a UE capability. The joint channel estimation may be associated with phase continuity maintenance requirements, so whether the UE is able to support joint channel estimation may be based at least in part on the UE capability to maintain phase continuity. An ability for the UE to maintain phase continuity may depend on whether an uplink channel transmission (e.g., a PUSCH transmission or a PUCCH transmission) is contiguous with another uplink channel transmission, or whether a gap exists between uplink channel transmissions. The gap may have a defined length and may be associated with a type of transmission (e.g., a downlink channel transmission). The uplink channel transmissions may include uplink channel repetitions, or may include a first uplink channel transmission and an uplink channel repetition. The phase continuity may be affected by the uplink channel transmissions, thereby impacting joint channel estimation and the UE's ability to maintain phase continuity.

Joint channel estimation and the associated phase continuity maintenance requirements may be applicable to sidelink communications between low mobility UEs. Two PSSCH repetitions may be associated with a same channel matrix H between a transmitter and a receiver. An example of such an association is $y_1 = H \cdot P x_1 + n_1$ and $y_2 = D_r \cdot H \cdot D_t \cdot P x_2 + n_2$, where $y_1$ indicates a first PSSCH repetition, $y_2$ indicates a second PSSCH repetition, $x_1$ and $x_2$ are transmitted signals, $n_1$ and $n_2$ are values associated with the transmitted signals, $D_r$ and $D_t$ may model RF change at the receiver and the transmitter, respectively, and P is a precoding matrix. In some cases, $D_r$ may be subject to receiver implementation and/or capability. For joint channel estimation, $D_r = D_t = 1$ may be assumed. In other words, an assumption may be made that the transmitter and the receiver are able to maintain phase continuity across transmissions for a plurality of antenna ports (e.g., all antenna ports). However, this assumption may be sensitive to RF changes. In some cases, $D = \text{diag}(a_1 e^{j\Theta_1}, \ldots)$ is a diagonal matrix with a phase and amplitude jump for each antenna port, and the UE may estimate D to determine the joint channel estimation.

Joint channel estimation (or DMRS bundling) may depend on a UE's ability to maintain a phase continuity. The UE may receive sidelink transmissions in a first slot and may receive sidelink transmissions in a second slot, and the second slot may not necessarily maintain a phase continuity with respect to the first slot. Phase continuity may be maintained only when various conditions are met, such as using a same transmission power, a same frequency domain resource allocation, same DMRS ports, a same codebook, same transmit spatial parameters, a same timing advance, no time gap between two adjacent PUSCH transmissions, a time gap between multiple transmissions that satisfies a threshold, and/or no downlink portions in two PUSCH transmissions.

In various aspects of techniques and apparatuses described herein, a receiving UE may receive, from a transmitting UE, a sidelink reference signal in a first symbol of a slot. The slot may be associated with a repeated transmission. The receiving UE may perform a joint channel estimation and an AGC based at least in part on the sidelink reference signal received in the first symbol of the slot. For example, the receiving UE may perform the joint channel estimation using a first portion of the first symbol, and the receiving UE may perform the AGC using a second portion of the first symbol. In some examples, the AGC may occur within a cyclic prefix duration, and the slot may be associated with a normal cyclic prefix. In some aspects, the AGC may exceed a cyclic prefix duration, and the slot may be associated with an extended cyclic prefix. In some aspects, performing the sidelink channel estimation and the AGC using the sidelink reference signal may relax the phase continuity maintenance requirement. The first symbol used for both the sidelink channel estimation and the AGC may have previously been used for only AGC, but may be repurposed to be used for both joint channel estimation and AGC.

Figure 6:
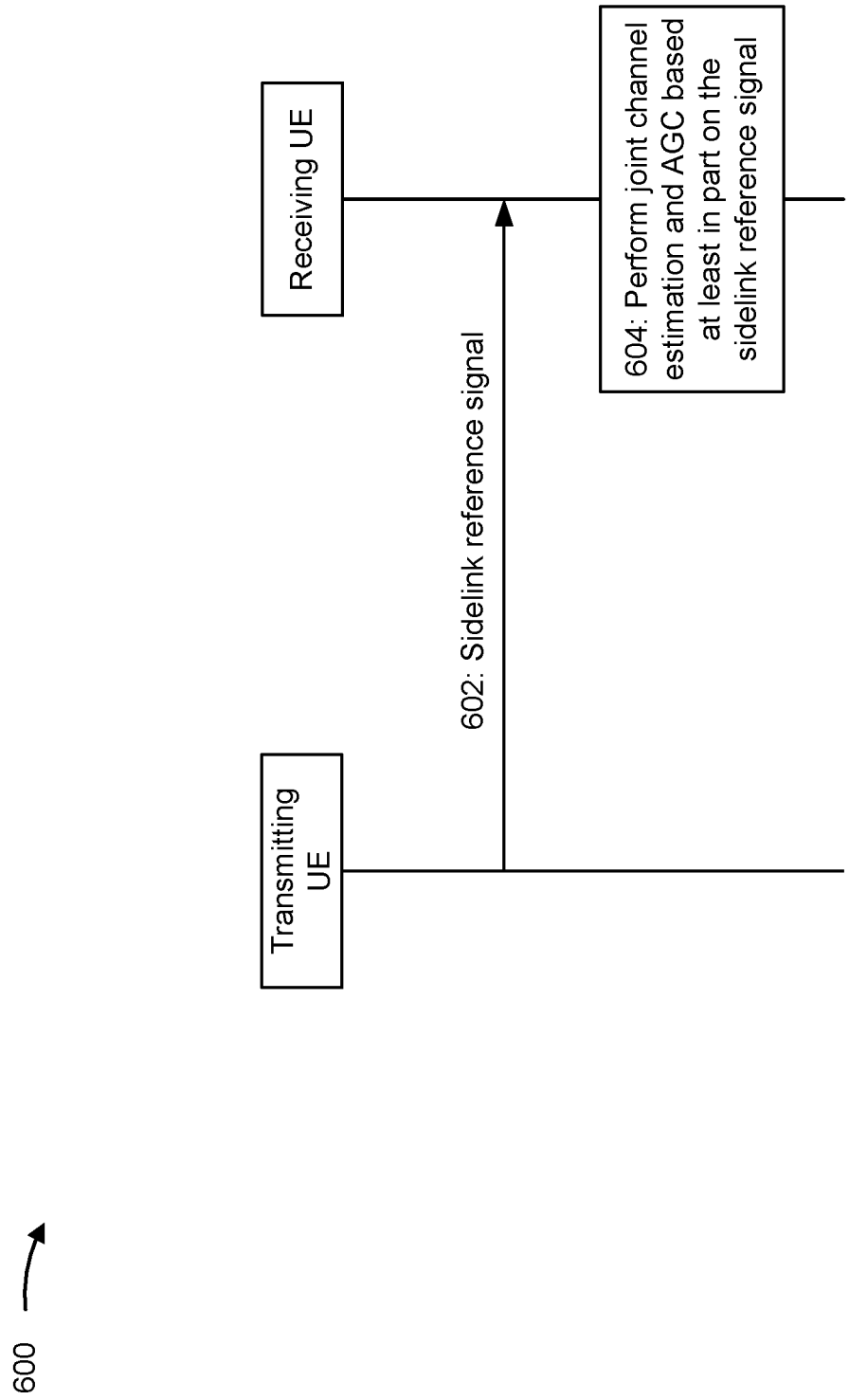
FIG. 6 is a diagram illustrating an example associated with transmitting sidelink reference signals for joint channel estimation and automatic gain control (AGC), in accordance with the present disclosure.

FIG. 6 is a diagram illustrating an example 600 of transmitting sidelink reference signals for joint channel estimation and AGC, in accordance with the present disclosure. As shown in FIG. 6, example 600 includes communication between a transmitting UE (e.g., UE 120*a*) and a receiving UE (e.g., UE 120*e*). In some aspects, the transmitting UE and the receiving UE may be included in a wireless network, such as wireless network 100.

As shown by reference number 602, the receiving UE may receive, from the transmitting UE, a sidelink reference signal in a first symbol of a slot. In some aspects, the slot may be associated with a repeated transmission. In some aspects, the sidelink reference signal may be a DMRS or a phase tracking reference signal (PT-RS). In some aspects, the sidelink reference signal may be based at least in part on a Zadoff Chu sequence associated with a peak to average power ratio (PAPR) that satisfies a threshold (e.g., a relatively low PAPR Zadoff Chu sequence). The Zadoff Chu sequence may be defined for a sidelink bandwidth part. In some aspects, the sidelink reference signal may be based at least in part on a subchannel index. In some aspects, the sidelink reference signal may be based at least in part on a sequence-based waveform with a PAPR that satisfies a threshold. For example, the sidelink reference signal may be based at least in part on a sequence-based waveform with a relatively low PAPR.

As shown by reference number 604, the receiving UE may perform a joint channel estimation and an AGC based at least in part on the sidelink reference signal received in the first symbol of the slot. The AGC may be associated with an AGC training or an AGC retraining. In some aspects, a first portion of the first symbol may be associated with the joint channel estimation and a second portion of the first symbol may be associated with the AGC.

In some aspects, the AGC may occur within a cyclic prefix duration. In this case, the slot may be associated with a normal cyclic prefix. In some aspects, the AGC may exceed a cyclic prefix duration. In this case, the slot may be associated with an extended cyclic prefix. In some aspects, the first symbol of the slot may be associated with the extended cyclic prefix. A gap symbol of a previous slot may be adjusted to allow the first symbol of the slot to be associated with the extended cyclic prefix. Alternatively, a gap symbol of the slot may be adjusted to allow the first symbol of the slot to be associated with the extended cyclic prefix. The gap symbol of the slot (or previous slot) may be shortened or lengthened to allow the extended cyclic prefix for the first symbol. Shortening the gap symbol may allow the first symbol to be lengthened. In some aspects, one symbol may be eliminated from the slot (e.g., the slot moves from 14 symbols to 13 symbols), such that both the first symbol and the gap symbol may be lengthened.

In some aspects, the first symbol of the slot and other selected symbols of the slot may be associated with extended cyclic prefixes. In some aspects, the transmitting UE and/or the receiving UE may receive, from a base station, an indication of cyclic prefix extensions for slots associated with a certain resource pool.

As indicated above, FIG. 6 is provided as an example. Other examples may differ from what is described with respect to FIG. 6.

Figure 7:
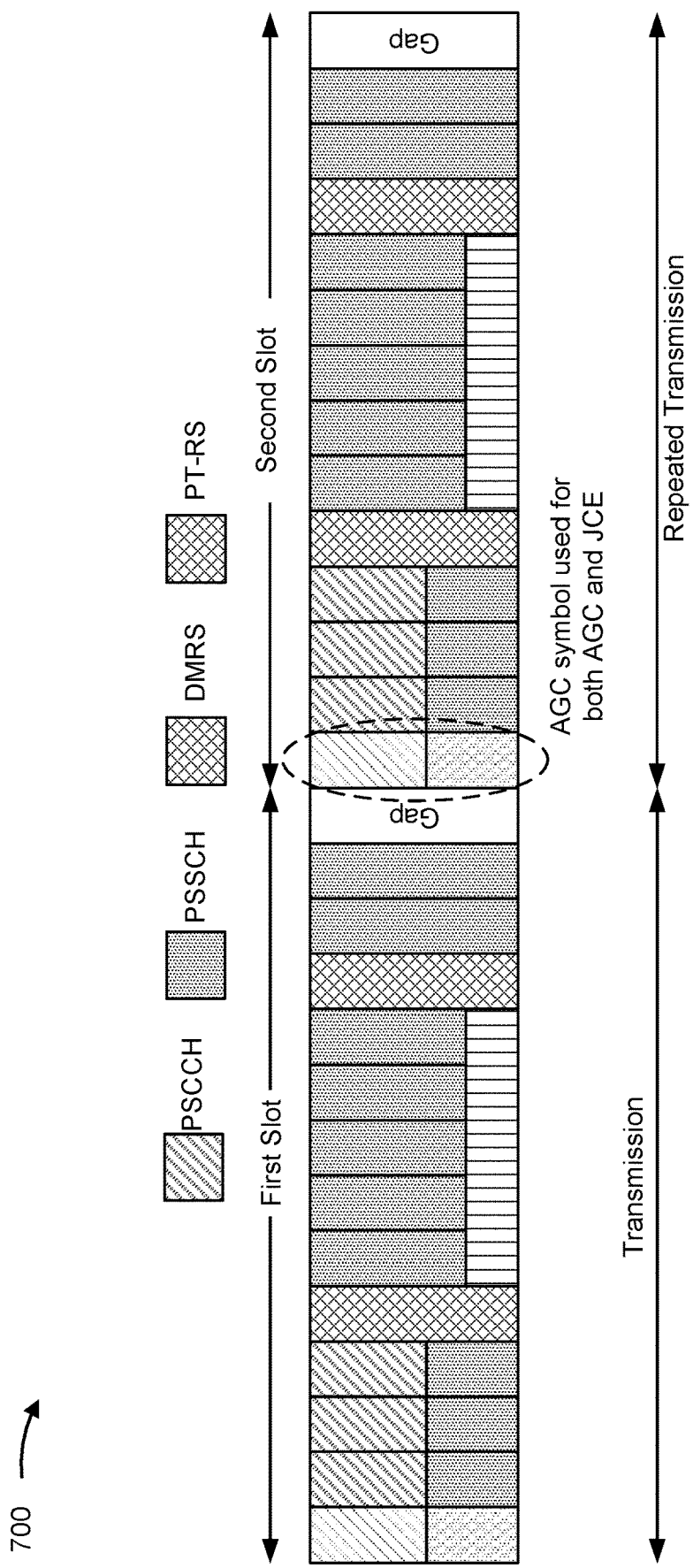
FIG. 7 is a diagram illustrating an example associated with a symbol for AGC and joint channel estimation, in accordance with the present disclosure.

FIG. 7 is a diagram illustrating an example 700 associated with a symbol for AGC and joint channel estimation, in accordance with the present disclosure.

A first slot may be associated with a PSCCH, a DMRS, a PSSCH, and a PT-RS. A second slot immediately after the first slot may be associated with a PSCCH, a DMRS, a PSSCH, and a PT-RS. The first slot may be associated with a transmission, and the second slot may be associated with a repeated transmission in relation to the transmission associated with the first slot.

In some aspects, a first symbol of a slot associated with a repeated transmission may be used for joint channel estimation and AGC. The AGC may involve an AGC (re-)training (i.e., training or retraining). A transmitting UE may transmit a sidelink reference signal in the first symbol of the slot. The sidelink reference signal may be a DMRS or a PT-RS. A receiving UE may receive the sidelink reference signal in the first symbol of the slot. The receiving UE may use a first portion of the first symbol for retraining an AGC within a cyclic prefix duration. The receiving UE may use a second portion of the first symbol for joint channel estimation (e.g., for estimating D). In some cases, the receiving UE may not perform AGC retraining, but rather may use a previous AGC setting. In some cases, a DMRS symbol in the slot may be omitted or reduced, based at least in part on the first symbol of the slot being used for both joint channel estimation and AGC.

In previous solutions, the first symbol of the slot was used for only AGC. Here, the first symbol associated with the slot may be used to transmit the sidelink reference signal, which may enable the first symbol to be used for both joint channel estimation and AGC.

As indicated above, FIG. 7 is provided as an example. Other examples may differ from what is described with respect to FIG. 7.

In some aspects, an AGC settling time may be based at least in part on a bandwidth, such as 2 resource blocks, 5 resource blocks, 10 resource blocks, 20 resource blocks, 50 resource blocks, 100 resource blocks, and so on. The AGC settling time may be shorter for a sidelink reference signal that occupies a larger bandwidth. In other words, a greater quantity of resource blocks used may correspond to the shorter AGC settling time. The AGC settling time may also be shorter when the sidelink reference signal is associated with a lower PAPR. The AGC settling time may be inversely proportional to a subcarrier spacing with a fixed quantity of resource blocks.

In some aspects, the sidelink reference signal may be based at least in part on a relatively low PAPR Zadoff Chu sequence, which may be defined for an entire sidelink bandwidth part. The sidelink reference signal may be generated (e.g., by a transmitting UE) based at least in part on a subchannel index. In some aspects, the sidelink reference signal may be based at least in part on a sequence-based waveform with low PAPR. In some aspects, a first part of the sidelink reference signal may be used for AGC, and a second part of the sidelink reference signal may be used for time domain joint channel estimation.

In some aspects, AGC (re-)training may occur within a cyclic prefix duration, which may be achievable for a relatively large resource block occupation and a constant envelope signal. The AGC (re-)training within the cyclic prefix duration may be suitable for a relatively small signal power variation, and may be triggered by a sidelink UE with a PSSCH allocation that satisfies a threshold (e.g., is larger than the threshold). For the AGC (re-)training within the cyclic prefix duration, a remaining portion of an OFDM symbol may be used for the joint channel estimation.

In some aspects, AGC (re-)training may exceed a cyclic prefix duration. In this case, a cyclic prefix extension may be used for a sidelink reference signal in a first symbol of a slot. In other words, the sidelink reference signal may be transmitted by a transmitting UE and received by a receiving UE using an extended cyclic prefix. A resource pool configuration may indicate support of an extended cyclic prefix in selected slots or a plurality of slots (e.g., all slots).

In some aspects, in a cyclic prefix extension design, a set of slots may use a normal cyclic prefix (NCP) while another set of slots may use an extended cyclic prefix (ECP).

In some aspects, a first symbol of a slot may be associated with an extended cyclic prefix (e.g., the extended cyclic prefix may be only for the first symbol). The first symbol may be an extended cyclic prefix symbol. A gap symbol of a previous slot may be adjusted (e.g., shortened or lengthened) to allow for the extended cyclic prefix in a next slot. In other words, the first symbol of the slot associated with the extended cyclic prefix may be included in the next slot, and the gap symbol of the previous slot may be adjusted to allow for the extended cyclic prefix in the next slot. In some aspects, a gap symbol of a current slot may be adjusted to allow for a first symbol of the current slot to be associated with an extended cyclic prefix. In other words, in the current slot, the first symbol may be associated with the extended cyclic prefix because the gap symbol of the current slot is adjusted.

In some aspects, a first symbol of a slot and selected symbols of the slot may be associated with an extended cyclic prefix (e.g., the extended cyclic prefix may be for first and selected symbols). The extended cyclic prefix may be supported for some symbols to align a slot boundary. For example, a slot associated with an extended cyclic prefix may contain only 13 symbols instead of 14 symbols, with two symbols having an extended cyclic prefix with ECP=0.5 NCP OFDM symbol duration.

In some aspects, a base station may signal, to a UE (e.g., a transmitting UE and/or a receiving UE), an indication of a cyclic prefix extension for slots. The signaling of the cyclic prefix extension may correspond to a certain resource pool. The UE may receive, from the indication, the indication of the cyclic prefix extension, and based at least in part on the indication, the UE may be aware of which slots are associated with extended cyclic prefixes.

Figure 8:
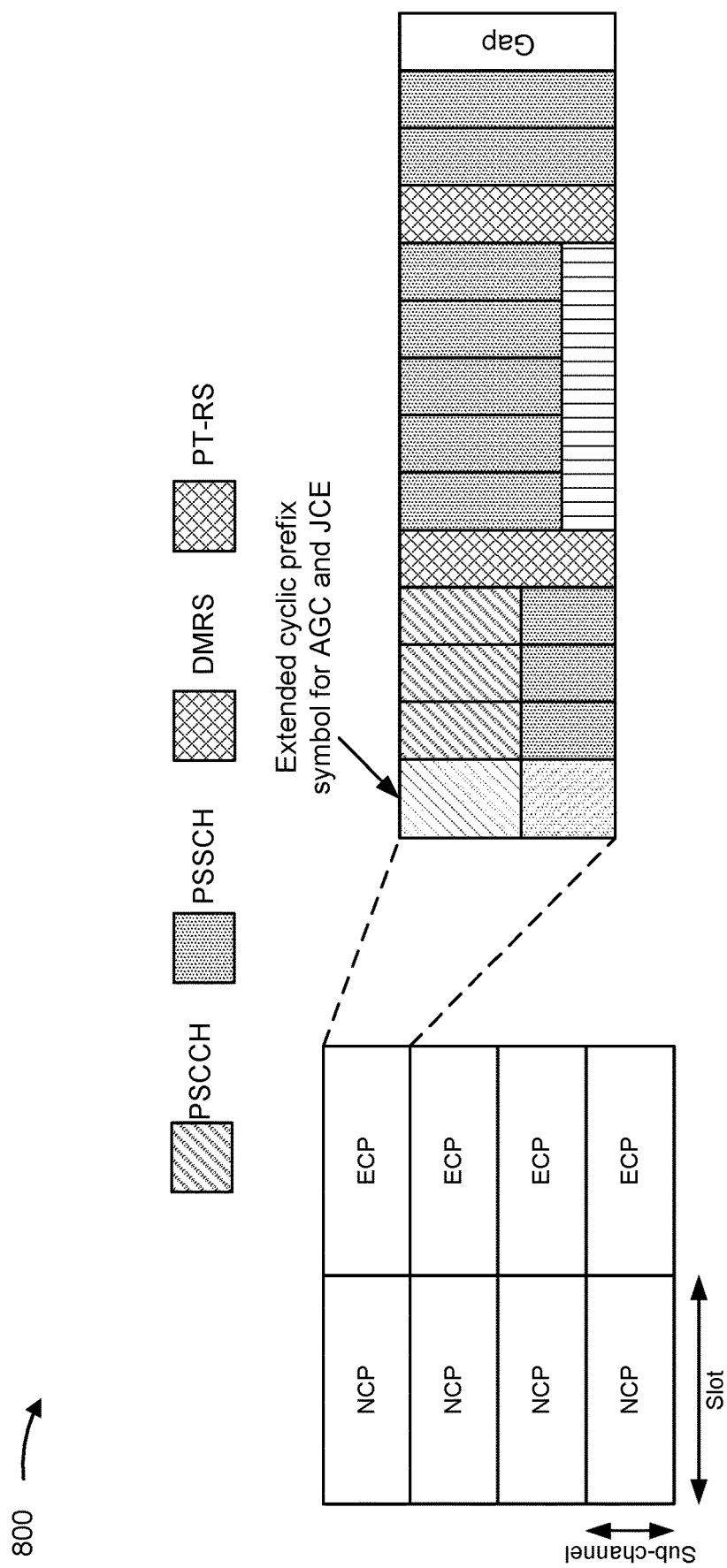
FIG. 8 is a diagram illustrating an example associated with an extended cyclic prefix symbol for AGC and joint channel estimation, in accordance with the present disclosure.

FIG. 8 is a diagram illustrating an example 80) associated with an extended cyclic prefix symbol for AGC and joint channel estimation, in accordance with the present disclosure.

As shown in FIG. 8, a slot may be associated with an extended cyclic prefix. The slot may include a first symbol. The first symbol may be associated with an extended cyclic prefix OFDM symbol. The first symbol may be an extended cyclic prefix symbol. The first symbol may be used for both joint channel estimation and AGC. In this example, the first symbol may not be based at least in pan on a gap symbol of a previous slot that is adjusted, or a gap symbol of the slot (e.g., the current slot) that is adjusted.

As indicated above. FIG. 8 is provided as an example. Other examples may differ from what is described with respect to FIG. 8.

Figure 9:
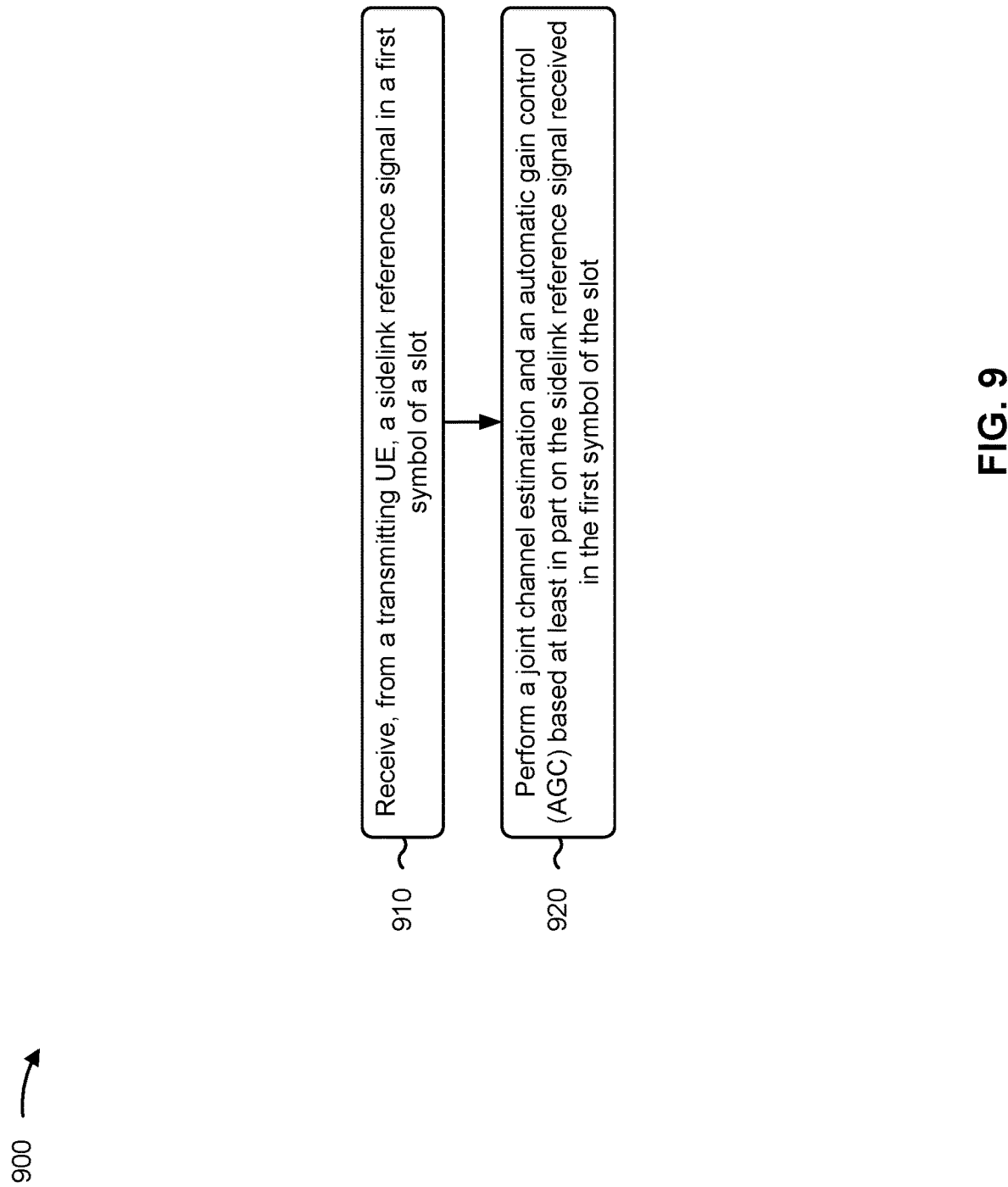
FIG. 9 is a diagram illustrating an example process associated with transmitting sidelink reference signals for joint channel estimation and AGC, in accordance with the present disclosure.

FIG. 9 is a diagram illustrating an example process 900 performed, for example, by a receiving UE, in accordance with the present disclosure. Example process 900 is an example where the receiving UE (e.g., UE 120e) performs operations associated with transmitting sidelink reference signals for joint channel estimation and AGC.

As shown in FIG. 9, in some aspects, process 900 may include receiving, from a transmitting UE, a sidelink reference signal in a first symbol of a slot (block 910). For example, the UE (e.g., using communication manager 140 and/or reception component 1002, depicted in FIG. 10) may receive, from a transmitting UE, a sidelink reference signal in a first symbol of a slot, as described above.

As further shown in FIG. 9, in some aspects, process 900 may include performing a joint channel estimation and an AGC based at least in part on the sidelink reference signal received in the first symbol of the slot (block 920). For example, the UE (e.g., using communication manager 140 and/or performance component 1008, depicted in FIG. 10) may perform a joint channel estimation and an AGC based at least in part on the sidelink reference signal received in the first symbol of the slot, as described above.

Process 900 may include additional aspects, such as any single aspect or any combination of aspects described below and/or in connection with one or more other processes described elsewhere herein.

In a first aspect, the slot is associated with a repeated transmission.

In a second aspect, alone or in combination with the first aspect, the sidelink reference signal is a DMRS or a PT-RS.

In a third aspect, alone or in combination with one or more of the first and second aspects, a first portion of the first symbol is associated with the joint channel estimation and a second portion of the first symbol is associated with the AGC.

In a fourth aspect, alone or in combination with one or more of the first through third aspects, the sidelink reference signal is based at least in part on a Zadoff Chu sequence associated with a peak to average power ratio that satisfies a threshold, and the Zadoff Chu sequence is defined for a sidelink bandwidth part.

In a fifth aspect, alone or in combination with one or more of the first through fourth aspects, the sidelink reference signal is based at least in part on a subchannel index.

In a sixth aspect, alone or in combination with one or more of the first through fifth aspects, the sidelink reference signal is based at least in part on a sequence-based waveform with a peak to average power ratio that satisfies a threshold.

In a seventh aspect, alone or in combination with one or more of the first through sixth aspects, the AGC occurs within a cyclic prefix duration, wherein the AGC is associated with an AGC training or an AGC retraining, and the slot is associated with a normal cyclic prefix.

In an eighth aspect, alone or in combination with one or more of the first through seventh aspects, the AGC exceeds a cyclic prefix duration, wherein the AGC is associated with an AGC training or an AGC retraining, and the slot is associated with an extended cyclic prefix.

In a ninth aspect, alone or in combination with one or more of the first through eighth aspects, the first symbol of the slot is associated with an extended cyclic prefix.

In a tenth aspect, alone or in combination with one or more of the first through ninth aspects, a gap symbol of a previous slot is adjusted to allow the first symbol of the slot to be associated with an extended cyclic prefix, or a gap symbol of the slot is adjusted to allow the first symbol of the slot to be associated with the extended cyclic prefix.

In an eleventh aspect, alone or in combination with one or more of the first through tenth aspects, the first symbol of the slot and other selected symbols of the slot are associated with extended cyclic prefixes.

In a twelfth aspect, alone or in combination with one or more of the first through eleventh aspects, process 900 includes receiving, from a base station, an indication of cyclic prefix extensions for slots associated with a certain resource pool.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
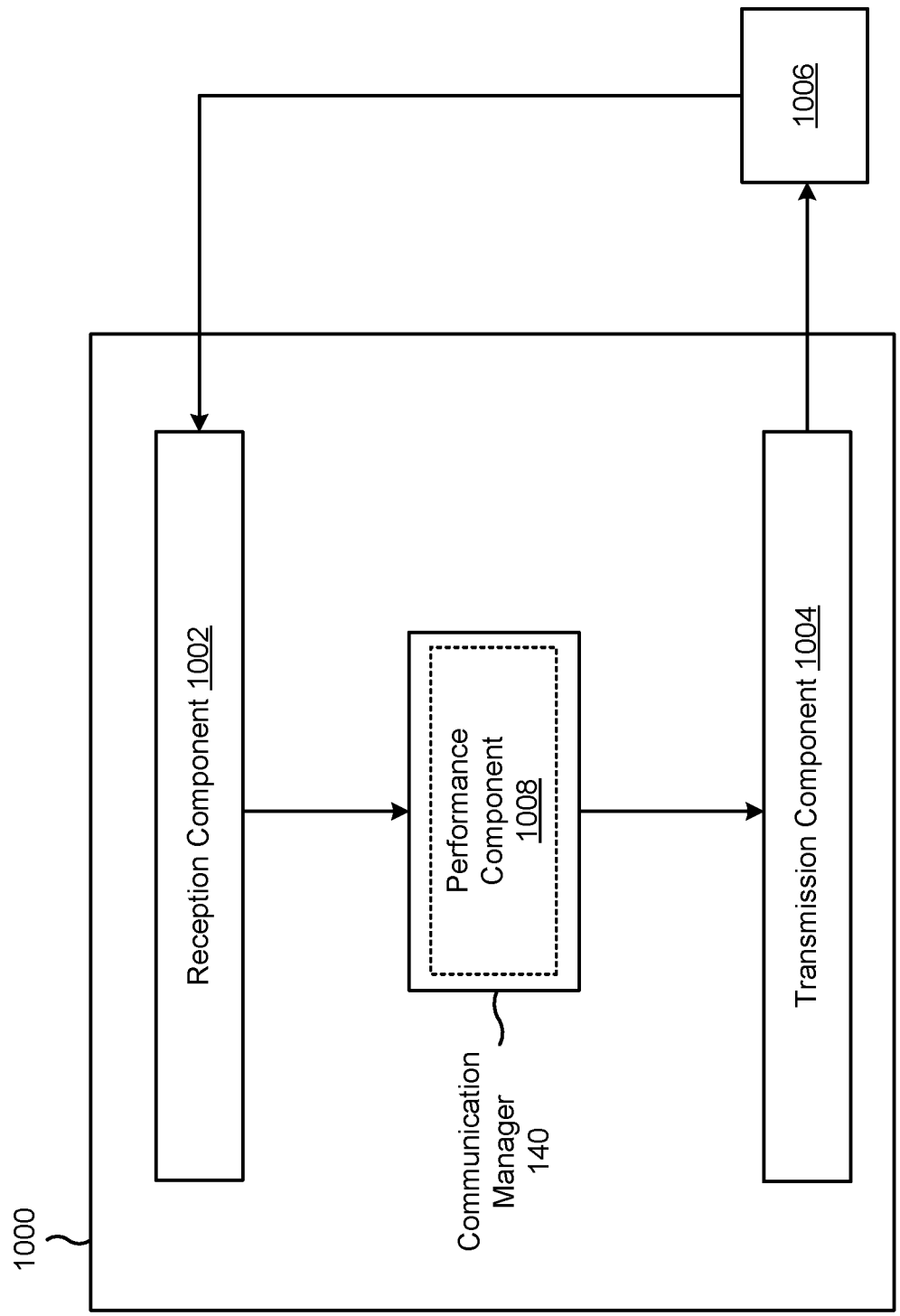
FIG. 10 is a diagram of an example apparatus for wireless communication, in accordance with the present disclosure.

FIG. 10 is a diagram of an example apparatus 1000 for wireless communication. The apparatus 1000 may be a receiving UE, or a receiving UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a performance component 1008, among other examples.

In some aspects, the apparatus 1000 may be configured to perform one or more operations described herein in connection with FIGS. 6-8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the receiving UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the receiving UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the receiving UE described in connection with FIG. 2. In some aspects, the transmission component 1004 may be co-located with the reception component 1002 in a transceiver.

The reception component 1002 may receive, from a transmitting UE, a sidelink reference signal in a first symbol of a slot. The performance component 1008 may perform a joint channel estimation and an AGC based at least in part on the sidelink reference signal received in the first symbol of the slot. The reception component 1002 may receive, from a base station, an indication of cyclic prefix extensions for slots associated with a certain resource pool.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a receiving user equipment (UE), comprising: receiving, from a transmitting UE, a sidelink reference signal in a first symbol of a slot; and performing a joint channel estimation and an automatic gain control (AGC) based at least in part on the sidelink reference signal received in the first symbol of the slot.

Aspect 2: The method of Aspect 1, wherein the slot is associated with a repeated transmission.

Aspect 3: The method of any of Aspects 1 through 2, wherein the sidelink reference signal is a demodulation reference signal or a phase tracking reference signal.

Aspect 4: The method of any of Aspects 1 through 3, wherein a first portion of the first symbol is associated with the joint channel estimation and a second portion of the first symbol is associated with the AGC.

Aspect 5: The method of any of Aspects 1 through 4, wherein the sidelink reference signal is based at least in part on a Zadoff Chu sequence associated with a peak to average power ratio that satisfies a threshold, and wherein the Zadoff Chu sequence is defined for a sidelink bandwidth part.

Aspect 6: The method of any of Aspects 1 through 5, wherein the sidelink reference signal is based at least in part on a subchannel index.

Aspect 7: The method of any of Aspects 1 through 6, wherein the sidelink reference signal is based at least in part on a sequence-based waveform with a peak to average power ratio that satisfies a threshold.

Aspect 8: The method of any of Aspects 1 through 7, wherein the AGC occurs within a cyclic prefix duration, wherein the AGC is associated with an AGC training or an AGC retraining, and wherein the slot is associated with a normal cyclic prefix.

Aspect 9: The method of any of Aspects 1 through 8, wherein the AGC exceeds a cyclic prefix duration, wherein the AGC is associated with an AGC training or an AGC retraining, and wherein the slot is associated with an extended cyclic prefix.

Aspect 10: The method of any of Aspects 1 through 9, wherein the first symbol of the slot is associated with an extended cyclic prefix.

Aspect 11: The method of any of Aspects 1 through 10, wherein: a gap symbol of a previous slot is adjusted to allow the first symbol of the slot to be associated with an extended cyclic prefix, or a gap symbol of the slot is adjusted to allow the first symbol of the slot to be associated with the extended cyclic prefix.

Aspect 12: The method of any of Aspects 1 through 11, wherein the first symbol of the slot and other selected symbols of the slot are associated with extended cyclic prefixes.

Aspect 13: The method of any of Aspects 1 through 12, further comprising: receiving, from a base station, an indication of cyclic prefix extensions for slots associated with a certain resource pool.

Aspect 14: An apparatus for wireless communication at a device, comprising a processor, memory coupled with the processor, and instructions stored in the memory and executable by the processor to cause the apparatus to perform the method of one or more of Aspects 1-14.

Aspect 15: A device for wireless communication, comprising a memory and one or more processors coupled to the memory, the one or more processors configured to perform the method of one or more of Aspects 1-14.

Aspect 16: An apparatus for wireless communication, comprising at least one means for performing the method of one or more of Aspects 1-14.

Aspect 17: A non-transitory computer-readable medium storing code for wireless communication, the code comprising instructions executable by a processor to perform the method of one or more of Aspects 1-14.

Aspect 18: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a receiving user equipment (UE), comprising:
    one or more memories storing processor-readable code; and
    one or more processors, coupled with the one or more memories, at least one of the one or more processors operable to cause the receiving UE to:
    receive, from a transmitting UE, a sidelink reference signal in a first symbol of a slot; and
    perform, in accordance with the sidelink reference signal received in the first symbol of the slot, a joint channel estimation using a first portion of the first symbol and an automatic gain control (AGC) training using a second portion of the first symbol, wherein the AGC training occurs within a cyclic prefix duration or within an extended cyclic prefix associated with the second portion of the first symbol.

2. The apparatus of claim 1, wherein the slot is associated with a repeated transmission.

3. The apparatus of claim 1, wherein the sidelink reference signal is a demodulation reference signal or a phase tracking reference signal.

4. The apparatus of claim 1, wherein the sidelink reference signal is associated with a Zadoff Chu sequence associated with a peak to average power ratio that satisfies a threshold, and wherein the Zadoff Chu sequence is defined for a sidelink bandwidth part.

5. The apparatus of claim 1, wherein the sidelink reference signal is associated with a subchannel index.

6. The apparatus of claim 1, wherein the sidelink reference signal is associated with a sequence-based waveform with a peak to average power ratio that satisfies a threshold.

7. The apparatus of claim 1, wherein the AGC training occurs within the cyclic prefix duration, and wherein the slot is associated with a normal cyclic prefix.

8. The apparatus of claim 1, wherein the AGC training exceeds the cyclic prefix duration, and wherein the slot is associated with the extended cyclic prefix.

9. The apparatus of claim 1, wherein the first symbol of the slot is associated with the extended cyclic prefix.

10. The apparatus of claim 1, wherein:
    a gap symbol of a previous slot is adjusted to allow the first symbol of the slot to be associated with the extended cyclic prefix, or
    a gap symbol of the slot is adjusted to allow the first symbol of the slot to be associated with the extended cyclic prefix.

11. The apparatus of claim 1, wherein the first symbol of the slot and other selected symbols of the slot are associated with extended cyclic prefixes, wherein the extended cyclic prefixes include the extended cyclic prefix.

12. The apparatus of claim 1, wherein the at least one of the one or more processors are further operable to cause the receiving UE to:
    receive, from a base station, an indication of cyclic prefix extensions for slots associated with a certain resource pool.

13. A method of wireless communication performed by a receiving user equipment (UE), comprising:
    receiving, from a transmitting UE, a sidelink reference signal in a first symbol of a slot; and
    performing, in accordance with the sidelink reference signal received in the first symbol of the slot, a joint channel estimation using a first portion of the first symbol and an automatic gain control (AGC) training using a second portion of the first symbol, wherein the AGC training occurs within a cyclic prefix duration or within an extended cyclic prefix associated with the second portion of the first symbol.

14. The method of claim 13, wherein the slot is associated with a repeated transmission.

15. The method of claim 13, wherein the sidelink reference signal is a demodulation reference signal or a phase tracking reference signal.

16. The method of claim 13, wherein the sidelink reference signal is associated with a Zadoff Chu sequence associated with a peak to average power ratio that satisfies a threshold, and wherein the Zadoff Chu sequence is defined for a sidelink bandwidth part.

17. The method of claim 13, wherein the sidelink reference signal is associated with a subchannel index.

18. The method of claim 13, wherein the sidelink reference signal is associated with a sequence-based waveform with a peak to average power ratio that satisfies a threshold.

19. The method of claim 13, wherein the AGC training occurs within the cyclic prefix duration, and wherein the slot is associated with a normal cyclic prefix.

20. The method of claim 13, wherein the AGC training exceeds the cyclic prefix duration, and wherein the slot is associated with the extended cyclic prefix.

21. The method of claim 13, wherein the first symbol of the slot is associated with the extended cyclic prefix.

22. The method of claim 13, wherein:
- a gap symbol of a previous slot is adjusted to allow the first symbol of the slot to be associated with the extended cyclic prefix, or
- a gap symbol of the slot is adjusted to allow the first symbol of the slot to be associated with the extended cyclic prefix.

23. The method of claim 13, wherein the first symbol of the slot and other selected symbols of the slot are associated with extended cyclic prefixes, wherein the extended cyclic prefixes include the extended cyclic prefix.

24. The method of claim 13, further comprising:
- receiving, from a base station, an indication of cyclic prefix extensions for slots associated with a certain resource pool.

25. A non-transitory computer-readable medium storing a set of instructions for wireless communication, the set of instructions comprising:
- one or more instructions that, when executed at a receiving user equipment (UE), cause the receiving UE to:
    - receive, from a transmitting UE, a sidelink reference signal in a first symbol of a slot; and
    - perform, in accordance with the sidelink reference signal received in the first symbol of the slot, a joint channel estimation using a first portion of the first symbol and an automatic gain control (AGC) training using a second portion of the first symbol, wherein the AGC training occurs within a cyclic prefix duration or within an extended cyclic prefix associated with the second portion of the first symbol.

26. The non-transitory computer-readable medium of claim 25, wherein a first portion of the first symbol is associated with the joint channel estimation and a second portion of the first symbol is associated with the AGC training.

27. A receiving apparatus for wireless communication, comprising:
- means for receiving, from a transmitting apparatus, a sidelink reference signal in a first symbol of a slot; and
- means for performing, in accordance with the sidelink reference signal received in the first symbol of the slot, a joint channel estimation using a first portion of the first symbol and an automatic gain control (AGC) training using a second portion of the first symbol, wherein the AGC training occurs within a cyclic prefix duration or within an extended cyclic prefix associated with the second portion of the first symbol.

28. The receiving apparatus of claim 27, wherein a first portion of the first symbol is associated with the joint channel estimation and a second portion of the first symbol is associated with the AGC training.

29. The apparatus of claim 1, wherein the AGC training comprises an AGC retraining.

30. The method of claim 13, wherein the AGC training comprises an AGC retraining.

* * * * *